Patented June 29, 1954

2,682,469

UNITED STATES PATENT OFFICE 2,682,469

FOOD PRODUCT AND METHOD OF MAKING

Gerald H. Stuart, New York, Hartley Howard, Hastings on Hudson, and John T. Watson, North Tarrytown, N. Y., Forest H. Clickner, Hollywood, Fla., and William A. Sommer, Elgin, Ill., assignors to The Borden Company, a corporation of New Jersey No Drawing. Application February 20, 1951, Serial No. 211,966

4 Claims. (Cl. 99—117)

This invention relates to a food product and the method of making it. The invention relates more particularly to a dried material which contains a large proportion of casein but which is palatable, desirable in flavor, and characterized by high capacity for absorbing and retaining water.

The use of dried casein as a glue and adhesive is well known. Casein is in extensive use for such purposes. When it has been attempted, however, to make a dried food consisting largely of casein, there have resulted such unpalatability and glueyness as to render the product undesirable as a food. In the case of bakers' cheese, for instance, drying the cheese even by the special methods proposed gives material of unsatisfactory flavor. The drying frequently gives also a product of very low water absorption and retention capacity that are inadequate for reconstitution of the dried product to a paste with the desired large proportion of water at the time of use and for satisfactory retention of water after baking the goods with the reconstituted paste. As a result, the use of bakers' cheese has been somewhat restricted, as to those areas such as large cities, to which the cheese, made nearby, may be distributed in undried condition or shipped under constant refrigeration. Cheesecake, which is very popular in some at least of the major cities, is not readily available at bakeries throughout the country generally, because of the difficulty of delivery of the necessary wet paste of bakers' cheese to the bakers in less populous centers and the unsatisfactory nature of dried bakers' cheese heretofore produced.

Our invention provides a dried casein product suitable for food purposes in which special addition is made before drying. The special addition imparts to the product after drying the palatable flavor similar to that of the undried material, absence of glueyness, and high specific water absorptiveness and retention. The high absorptiveness is favorable to reconstitution of the dried product into a paste with more water and, therefore, at a lower cost per pound of the reconstituted paste of proper consistency than was heretofore possible. The high retentiveness makes possible retention of the desired proportion of water in the baked goods.

Briefly stated our invention comprises the method of and the product resulting from applying an aqueous solution of lactalbumin and lactic acid to particles of undried casein and then intimately mixing and spray drying the product at a temperature below that of coagulation of the lactalbumin. In a modification of the invention, a small proportion of a vegetable fat is introduced in such special manner as to cause it to be distributed inside the particles of spray dried product; the fat so incorporated retains volatile flavors without interfering with subsequent rewetting when water is added.

As to materials, we use the casein in freshly prepared, that is, unheated and undried condition. Such a product is made to advantage by the usual procedure in which the casein is coagulated, as by rennet, from the water soluble materials in solution in defatted cows' milk. The casein may then be separated substantially completely from the whey.

As the lactalbumin, we use cows' milk albumin. There is no advantage known to us in the use of any of the other and more expensive forms of this type of material. This albumin as used is in uncoagulated and water soluble condition. In fact, the albumin remains uncoagulated in our process and product and first undergoes coagulation when incorporated and then cooked in the ultimate food, as in baking a cheesecake containing our product.

The lactic acid which is used is either commercial edible lactic acid or the lactic acid contained in whey. Since whey is the cheapest source of both the lactic acid and albumin, it is the preferred form in which these two ingredients are applied to the casein.

As to proportions, we use the albumin in amount corresponding to 3 to 5 parts for 100 parts of the casein, the proportions here and elsewhere herein being expressed as parts by weight on the dry basis unless specifically stated to the contrary. When we use less of the albumin than the minimum stated, there is inadequate protection of the casein flavor during the subsequent drying step and also insufficient water adsorption capacity and water retention (on baking) of the dried material. When the amount of the albumin used is in excess of the maximum stated, any advantage obtained fails to offset the extra cost, when pure lactalbumin is used, or the disadvantage of foreign substances when the albumin is used in impure form, as in whey.

The proportion of the lactic acid used is 7 to 15 parts for 100 of the casein.

The lactic acid and albumin are applied in aqueous solution to the casein. The aqueous solution forms a coating of the albumin and lactic acid over the particles of casein. The resulting mixture is then made intimate and the whole reduced to a smooth flowable paste by any convenient means, a comminuter such as used in the food products industry being the preferred mechanism. A satisfactory proportion of water in the paste at this stage is 85 to 95 parts for 7 to 10 parts of casein.

The paste so made is then subjected to spray drying. The paste is sprayed or otherwise distributed in the form of fine particles in a stream of warm air, the resulting dried solid particles are separated, and the spent air is released from the equipment. While we operate at low temperatures, such as an outgoing air temperature of 150° to 160° F., giving a temperature to the spray dried material not above 150° F. by a substantial amount. These temperatures are known to be close to but not as high as those at which casein and lactalbumin undergo heat denaturing in a short period of time. These temperatures also are not sufficiently high to destroy the rehydration properties, as stated elsewhere herein. The low temperature alone is not adequate to give to the finished product the desired flavor and water absorption and retention unless the albumin and lactic acid are incorporated as stated.

The invention will be further illustrated by description in connection with the following specific examples, the technique being that which is conventional in the making of cheese and like products except as stated to the contrary and except for the application to the casein of the lactalbumin and lactic acid in the proportions stated.

EXAMPLE 1

*Making spray dried casein food product*

A lactic acid producing culture of non-pathogenic organisms (starter) and in the amount of 160 lbs. was added to 2295 lbs. of pasteurized skim milk. The skim milk with this added starter was then warmed to 92°–94° F. 6.8 cc. of rennet diluted with 30 times its volume of water was then introduced into the skim milk. The whole batch was then allowed to stand for four hours until the acidity developed corresponded to 0.5% calculated as lactic acid.

A small amount of whey was expelled which was dipped off. This left a product of approximately 9–9½ solids. The resulting curd containing principally casein and water was then transferred to cloth bags for draining. Draining was then carried out overnight or until the resulting curd arrived at solids content 20%–30%. To facilitate increased solids, pressing was then carried out.

The drained, or drained and pressed, cheese curd is then transferred to a mixing tank and combined with uncoagulated lactalbumin 4 lbs., lactic acid in amount to make the total present 12 lbs., and water to reduce the solids content to about 12%.

The wet mix was then passed through a comminuting machine (Homoloid) which finely disperses the curd particles in the aqueous medium. The flowable paste which issued from the comminuter was then spray dried. The pump pressure used was 1500 lbs. to the square inch, the material was sprayed through a nozzle of size No. 76, the temperature of the inlet air to the drying chamber was 250° F., and the temperature of the outgoing air was 150° to 160° F.

The product made as described was a powder of cheese-like flavor, was not sticky or gluey, and, when mixed with water to form a paste shows a specific water absorption of 2.5 to 3.5. That is, it absorbed readily 2.5 to 3.5 parts of water to 1 of solids, on the dry basis, with the production of a paste that was firm even after rehydration by this large proportion of water. The product contains the lactalbumin in uncoagulated, water soluble condition.

EXAMPLE 2

*Bakery product including the spray dried material*

To 20.6 pounds water in a mixing bowl, there were added 8.25 pounds of the cheese powder made as described in Example 1. The materials were mixed until the resulting mixture was smooth. 3 pounds of flour, 6 oz. of salt, 5 oz. of vanilla flavor, 5 oz. of lemon flavoring, 1.3 pounds skim milk powder, 5.3 pounds egg yolks, and 10 pounds of sour cream were added to the above smooth mix and the whole creamed until again smooth. 10 pounds of water were then added and again mixed smooth. 15 pounds of egg whites were then beaten to a wet peak. 19 pounds of sugar and 4 pounds of water which had been heated to 245° F. were then added to the beaten egg whites. This resulting meringue was then carefully folded into the cheese batter first made, in about the manner used in making angel food cake mix.

The whole was then baked at 350° F. for 50 minutes until the batter set. The product was a cheese cake of excellent quality and without the characteristic off-flavor of casein dried without the added albumin and lactic acid.

As to the mechanism by which the flavor and rehydration properties of the spray dried material are realized, we consider that the lactic acid and albumin are in close association with the casein or are actually coated over the particles practically continuously at the start of the spray drying operation. The albumin, the lactic acid, and, when whey is used, the lactobacilli and the solids which they elaborate protect the casein particles from being modified to the gluey condition characteristic of the usual dried casein products. Also, the applied albumin and acid, coated on the particles and appearing in substantial proportion in the surface portions thereof, are hydrophilic. They are soluble in water. They protect the curd flavor and promote the rehydration of the spray dried particles in contact with water.

EXAMPLE 3

*Incorporation of fat before spray drying*

In introducing a fat before the spray drying stage, as a means of retaining flavor in the finished spray dried product, we use fats that are either animal or vegetable, liquid or solid at room temperature, or a mixture of fats of various kinds are used. The selected fat is melted and creamed and homogenized with water, at a low temperature, before being added to the curd separated from the rennet coagulation of milk as described in Example 1. In mixing the curd and creamed fat, it is important that the conditions be such that the fat in the finished product after spray drying will be found to be surrounded by protein. This requires mild mixing, as by comminution, rather than high pressure homogenization.

More specifically, skim milk is pasteurized at 145° F. for 30 minutes, then cooled to 72° F. The lactic acid producing culture or starter is added in the proportion of 10 to 70 pounds for 1,000 of the skim milk, the exact proportion depending upon how active a starter is available. Rennet extract is then added in the amount of 0.75 to 10 cc. for each 1,000 pounds of the skim milk. The whole is then allowed to stand, without agitation, until the desired coagulation is obtained. The coagulum or curd thus obtained is then scooped out and transferred to bags for draining, the drainage being effected in part before the transfer to the bags and being continued in the bags until the desired acidity and solids concentration are realized. This will be a solids content of 20% to 30%. To facilitate drainage at the end, the bags may be pressed to increase the solids content still higher, although this is not necessary.

The drained or drained and pressed cheese curd is then transferred to a mixing tank. Here lactalbumin and lactic acid are added in the form of whey in limited proportion to make the solids content approximately 12%. To this mixture, there is then added a slurry representing an 18% fat emulsion in water, the fat used being hydrogenated cottonseed, coconut, hydrogenated coconut, or peanut oil, or destearinated beef fat, lard, or other fat used as shortening.

In making this emulsion, the fat is warmed. If the fat is normally a solid, the fat is warmed to a temperature slightly above its melting point. The warmed fat in liquid condition is then mixed with water at the same temperature as the fat. The resulting mixture is creamed by gentle mixing.

The fat emulsion so made is mixed with the diluted cheese curd slurry in proportion to make the resulting product have a total solids, i. e., non-volatile content, of approximately 11% to 12% and the proportion of the added fat being about 3 to 10 parts for 100 parts of casein on the dry basis.

The combined mix of the cheese curd slurry and the fat emulsion are then run through the Homoloid or otherwise comminuted without pressure, the fat becoming the dispersed phase.

The resulting slurry is delivered to the spray drier, under the conditions of operation of it described in Example 1.

EXAMPLE 4

*Introduction of fat without lactalbumin or lactic acid*

The procedure of Example 3 is followed except that the whey there used to dilute the cheese curd back to a solids content of about 12% is replaced by water in amount to make the diluted curd of the same solids content.

The fat, used without the lactalbumin and lactic acid and being enclosed within the particles of protein after the drying operation, does not interfere with the wetting of the product with water.

EXAMPLE 5

*Use of whey*

The procedure of Example 1 is used except that the lactalbumin and lactic acid solution there used is replaced by 700 to 1,200 parts of whey for 100 parts of casein, the whey containing about 0.5% to 1% of lactic acid.

EXAMPLE 6

*Modified use of whey*

A lactic acid producing culture of non-pathogenic organisms and in the amount of 160 pounds was added to 2,295 pounds of pasteurized skim milk. The skim milk with this added starter was then warmed to 92° to 94° F. At that temperature there were introduced 6.8 cc. rennet diluted with 30 times its volume of water. The whole mixture was allowed to stand for about 4 hours and until the acidity developed corresponded to 0.5%, acidity being calculated herein as lactic acid.

The resulting curd was then cut with a knife and warmed to 100° F. with slow agitation until the desired curd consistency and separation from whey resulted. The resulting whey was then drawn off rapidly from the vat and the curd caused to set overnight.

If the curd is cut at an acidity lower than 0.50%, the cheese is likely to be tough and rubbery and will mat. If the acidity is allowed to go much beyond 0.50%, then the cubes are very fragile and it is almost impossible to work the vat without breaking the cubes and forming a lot of fine particles. To allow the acidity to develop too much at this point of the process makes the further separation of the whey not only more difficult but also results in a loss of fine curd particles which are drawn off with the whey.

Immediately after separation from the whey, the curd had a total solids content of 19.3% and acidity of 1.2%. The curd contains casein, whey, and starter. The curd was comminuted and held overnight, so that the acidity builds up to about 10% of the weight of the casein. The material was then reduced by water to approximately 15% solids and spray dried as described in Example 1.

EXAMPLE 7

*Use of milk*

The procedure of Example 5 is followed except that the whey is replaced by an equal weight of skim milk in which lactic acid has been developed, through the use of the starter, to the concentration of 0.5% to 1%.

Into the composition of Examples 1–5 before the spray drying there may be introduced skim milk powder in limited proportion for stabilization, sugar to aid in the rewetting operation, and various emulsifiers, as, for instance, mono- or diglycerides of higher fatty acids or the corresponding esters of such acids with sorbitan or polyoxyalkylene. There may be introduced also various flavoring and miscellaneous additives that are conventional in the manufacture of the cheese or bakery products before the comminuting (stirring).

It will be understood that it is intended to cover all changes and modifications of the examples of the invention herein chosen for the purpose of illustration which do not constitute departures from the spirit and scope of the invention. Thus we may effect the initial coagulation of the casein in the milk by the use of rennet alone, separating the curd thus produced from most of the whey and thereafter adding starter to the curd and residual whey and adjusting the proportions of lactic acid and lactalbumin to casein within the limits stated.

What we claim is:

1. In making a dried food product of high casein content, palatable non-casein flavor, specific water absorption of at least 2.5, high water retention, and non-glueyness, the method which comprises applying a coating of an aqueous solution of lactalbumin and lactic acid over particles of casein in freshly prepared undried condition, comminuting the coated material to give a flowable uniformly dispersed mixture, and then spray drying the said mixture at a temperature thereof below that of heat denaturing the casein and of insolubilizing the lactalbumin.

2. The method of claim 1 in which the proportion of lactalbumin is 3 to 5 parts and of lactic acid 7 to 15 parts for 100 parts of the casein on the dry basis.

3. A food product comprising, in intimate association and in spray dried condition, casein, lactalbumin, and lactic acid in the proportion of 3 to 5 parts of the lactalbumin and 7 to 15 of lactic acid for 100 of the casein on the dry basis, the casein being in non-heat-denatured condition, the lactalbumin being water soluble, and the product having the property, when mixed with water, or absorbing at least 2.5 parts water for 1 part of the said product and after the absorption remaining a firm paste suitable for incorporation into bakery goods and being the product of the method of claim 9.

4. In making a dried food product of high casein content, palatable non-casein flavor, specific water absorption of at least 2.5, high water retention and non-glueyness, the method which comprises comminuting freshly prepared casein in undried and unheated condition with cows' milk whey containing lactic acid and lactalbumin in soluble form and in the proportion to furnish 3 to 5 parts of lactalbumin for 100 parts of the casein on the dry basis and then spray drying the resulting mixture at a temperature below that of heat denaturing the casein and of insolubilizing the lactalbumin.

References Cited in the file of this patent

UNITED STATES PATENTS

| Number | Name | Date |
|--------|------|------|
| 515,736 | Angus | Mar. 6, 1894 |
| 1,374,555 | Dick | Apr. 12, 1921 |
| 2,015,257 | Clickner | Sept. 24, 1935 |